US010345804B2

(12) United States Patent
Sharber et al.

(10) Patent No.: US 10,345,804 B2
(45) Date of Patent: Jul. 9, 2019

(54) METHOD AND SYSTEM FOR REMOTE PROCESSING AND ANALYSIS OF INDUSTRIAL ASSET INSPECTION DATA

(71) Applicant: General Electric Company, Schenectady, NY (US)

(72) Inventors: Dustin Michael Sharber, Oklahoma City, OK (US); Ashraf Osama El-Messidi, Oklahoma City, OK (US); Nasr Eldine Alkadi, Oklahoma City, OK (US); Pejman Kazempoor, Edmond, OK (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 217 days.

(21) Appl. No.: 15/285,412

(22) Filed: Oct. 4, 2016

(65) Prior Publication Data
US 2018/0095458 A1 Apr. 5, 2018

(51) Int. Cl.
*B64C 39/02* (2006.01)
*G05D 1/00* (2006.01)
(Continued)

(52) U.S. Cl.
CPC ......... *G05D 1/0027* (2013.01); *G06T 1/0007* (2013.01); *H04W 4/185* (2013.01);
(Continued)

(58) Field of Classification Search
CPC ............ B64C 39/024; B64C 2201/141; B64C 2201/024; B64C 2201/027;
(Continued)

(56) References Cited

U.S. PATENT DOCUMENTS 6,766,226 B2 *  7/2004  Andersen ................. F17D 5/06
                                                           348/144
7,027,924 B2 *  4/2006  Spoonhower .......... G01M 3/005
                                                           250/253

(Continued)

FOREIGN PATENT DOCUMENTS

CN     201707324 U    1/2011
CN     203745448 U    7/2014
(Continued)

OTHER PUBLICATIONS

Gallego et al., "Unmanned aerial gas leakage localization and mapping using microdrones", Sensors Applications Symposium (SAS), 2015 IEEE, pp. 1-6, Apr. 13-15, 2015, Zadar.
(Continued)

*Primary Examiner* — Richard A Goldman
(74) *Attorney, Agent, or Firm* — Mintz Levin Cohn Ferris Glovsky and Popeo, P.C.

(57) ABSTRACT

A remote processing device for processing inspection data collected by one or more inspection apparatuses includes a communication unit and an on-board computing device coupled to the communication device. The communication unit is configured to transmit data to and receive data from one or more inspection apparatuses. The on-board computing device includes at least one processor and a memory device coupled to the at least one processor. The at least one processor is configured to receive geotagged unprocessed image data from the inspection apparatuses over a first communication channel, receive geotagged fluid concentration data from the inspection apparatuses over a second communication channel, process the geotagged unprocessed image data into one or more image files, generate a fluid data map by overlaying the geotagged fluid concentration data
(Continued)

over the one or more image files, and transmit the fluid data map to one or more remote computing devices.

29 Claims, 4 Drawing Sheets

(51) Int. Cl.
*G06T 1/00* (2006.01)
*H04W 4/18* (2009.01)
*H04L 29/08* (2006.01)
*H04L 29/06* (2006.01)
*H04W 4/38* (2018.01)

(52) U.S. Cl.
CPC ...... *B64C 2201/127* (2013.01); *H04L 67/125* (2013.01); *H04L 67/18* (2013.01); *H04L 69/14* (2013.01); *H04W 4/38* (2018.02)

(58) Field of Classification Search
CPC ........ B64C 2201/128; B64C 2201/127; B64C 2201/126; B64C 2201/123; G01C 21/16; G01C 21/165; G05C 1/0808; G05C 1/0816; G05C 1/0858; H04N 5/33332; H04N 2201/3247; H04N 2201/3243; H04N 1/32101; H04N 1/32106; H04N 1/32128; H04N 1/32144
USPC ................ 701/3, 4, 5, 6, 7, 8, 10, 454, 523; 244/17.13, 180; 356/437, 326, 303; 382/100; 250/339.12, 339.13, 339.06
See application file for complete search history.

(56) References Cited

U.S. PATENT DOCUMENTS

| | | | | |
|---|---|---|---|---|
| 7,391,409 B2* | 6/2008 | Zalewski | ................. | G06F 3/017 345/156 |
| 7,411,196 B2* | 8/2008 | Kalayeh | ............... | G01C 11/025 250/342 |
| 7,851,766 B2* | 12/2010 | Frank | ........................ | G01T 3/08 250/358.1 |
| 7,965,314 B1* | 6/2011 | Miller | .............. | G08B 13/19643 250/330 |
| 8,010,300 B1* | 8/2011 | Stearns | ................... | G01S 17/95 702/24 |
| 8,013,303 B2* | 9/2011 | Ershov | ................... | G01N 21/39 250/339.06 |
| 8,284,986 B2* | 10/2012 | Wolowelsky | ...... | G01N 21/3518 382/100 |
| 8,345,250 B1* | 1/2013 | Janosky | .................. | G01S 17/87 250/338.5 |
| 8,688,375 B2* | 4/2014 | Funk | .................... | G01C 21/165 340/995.19 |
| 8,730,461 B2* | 5/2014 | Andreussi | ............... | G01M 3/38 356/72 |
| 8,781,755 B2* | 7/2014 | Wong | ................... | G01S 15/885 702/22 |
| 8,787,904 B1* | 7/2014 | Hayes | ................... | H04W 4/046 370/316 |
| 9,036,509 B1* | 5/2015 | Addepalli | ............. | H04W 4/046 370/259 |
| 2002/0149617 A1* | 10/2002 | Becker | .................. | G06F 3/1454 715/751 |
| 2004/0017984 A1* | 1/2004 | Thiele | ....................... | G02B 6/32 385/91 |
| 2004/0263852 A1* | 12/2004 | Degtiarev | ............... | G01M 3/38 356/437 |
| 2006/0068371 A1* | 3/2006 | Ortyn | .................... | G01J 3/2889 435/4 |
| 2009/0245581 A1* | 10/2009 | Dey | .......................... | F17D 5/06 382/104 |
| 2014/0067801 A1* | 3/2014 | Marvit | .............. | G06F 17/30241 707/736 |
| 2014/0219124 A1* | 8/2014 | Chang | .................. | H04B 7/0413 370/252 |
| 2015/0215410 A1* | 7/2015 | Mateos Sole | ........... | H04L 67/18 709/219 |
| 2015/0237223 A1* | 8/2015 | Fung | .................. | H04N 1/00204 348/207.1 |
| 2015/0356482 A1* | 12/2015 | Whipple | .......... | G06Q 10/06313 705/7.23 |
| 2015/0356749 A1* | 12/2015 | Son | ..................... | G01C 21/3667 701/454 |
| 2016/0144959 A1* | 5/2016 | Meffert | ................. | B64C 39/024 701/3 |
| 2016/0214715 A1* | 7/2016 | Meffert | ................. | B64C 39/024 |
| 2016/0284075 A1* | 9/2016 | Phan | ....................... | G06T 7/001 |
| 2017/0161968 A1* | 6/2017 | Xie | ........................ | H04L 1/1664 |
| 2017/0192401 A1* | 7/2017 | Wexler | .............. | G06F 17/30312 |
| 2017/0264833 A1* | 9/2017 | Barnes | .................... | H04N 5/332 |
| 2018/0095032 A1* | 4/2018 | Alkadi | .................... | G01C 21/20 |
| 2018/0095458 A1* | 4/2018 | Sharber | ................ | G05D 1/0027 |

FOREIGN PATENT DOCUMENTS

| | | |
|---|---|---|
| CN | 104279425 A | 1/2015 |
| CN | 204114580 U | 1/2015 |
| CN | 105203264 A | 12/2015 |
| WO | 2016/103067 A1 | 6/2016 |

OTHER PUBLICATIONS

Peng et al., "Integration of an unmanned vehicle and its application to real-time gas detection and monitoring", Consumer Electronics—Taiwan (ICCE-TW), 2015 IEEE International Conference on, pp. 320-321, Jun. 6-8, 2015, Taipei.

International Search Report and Written Opinion issued in connection with corresponding PCT Application No. PCT/US2017/054210 dated Dec. 7, 2017.

* cited by examiner

METHOD AND SYSTEM FOR REMOTE PROCESSING AND ANALYSIS OF INDUSTRIAL ASSET INSPECTION DATA

BACKGROUND

The field of the disclosure relates generally to a remote processing device for use with inspection apparatuses and, more particularly, to a remote processing device and method for inspecting industrial assets with inspection apparatuses.

Inspection apparatuses include ground, air, and water-based vehicles that may be autonomous, semi-autonomous, or piloted. Such inspection apparatuses often include onboard navigation systems, such as inertial navigation systems, and satellite navigation systems. Certain known inspection apparatuses further include one or more sensors for capturing data corresponding to the environment in which the inspection apparatuses are operating. For example, some known inspection apparatuses inspect industrial assets, such as oil and gas processing equipment, by capturing sensor data relevant to the operational status of the equipment. At least some known inspection apparatuses perform on-board processing of collected data before transmission to another computing device. Such on-board processing negatively affects available mission time for the inspection apparatus by consuming power to perform the processing and by adding weight to the inspection apparatus for specialized processing hardware. Accordingly, operators are often forced to choose between incomplete data regarding the industrial asset being inspected or the time consuming, expensive, and inefficient course of performing multiple inspection passes of the industrial equipment.

BRIEF DESCRIPTION

In one aspect, a remote processing device for processing inspection data collected by one or more inspection apparatuses is provided. The remote processing device is configured to be remotely located from the one or more inspection apparatuses during collection of the inspection data and includes a communication unit configured to transmit data to the one or more inspection units and to receive data from the one or more inspection units. The remote processing device further includes an on-board computing device coupled to the communication unit. The on-board computing device includes at least one processor and a memory device coupled to the at least one processor. The at least one processor is configured to receive, from the one or more inspection apparatuses, geotagged unprocessed image data over a first communication channel and geotagged fluid concentration data over a second communication channel. The at least one processor is further configured to process the geotagged unprocessed image data into one or more image files, to generate a fluid data map by overlaying the geotagged fluid concentration data over the one or more image files, and to transmit the fluid data map to one or more remote computing devices.

In a further aspect, one or more non-transitory computer-readable storage media having computer-executable instructions embodied thereon for use in processing inspection data is provided. The instructions are executable by a processor of a remote processing device for processing inspection data collected by one or more inspection apparatuses that is configured to be remotely located from the one or more inspection apparatuses during collection of the inspection data. When executed by the processor, the computer-executable instructions cause the processor to receive, from one or more inspection apparatuses, geotagged fluid concentration data over a first communication channel and geotagged unprocessed image data over a second communication channel. The instructions also cause the processor to process the geotagged unprocessed image data into one or more image files and generate a fluid data map by overlaying the geotagged fluid concentration data over the one or more image files. The instructions further cause the processor to transmit the fluid data map to one or more remote computing device.

In yet another aspect, a method of consolidating and visualizing inspection data collected by one or more inspection apparatuses is provided. The method is executable by a remote processing device configured to be remotely located from the one or more inspection apparatuses during collection of the inspection data and including an on-board computing device including at least one processor coupled to a memory device. The method comprises receiving, from the one or more inspection apparatuses, geotagged unprocessed image data over a first communication channel and geotagged fluid concentration data over a second communication channel. The method also includes processing, using the computing device, the geotagged unprocessed image data into one or more image files and generating a fluid data map by overlaying the geotagged fluid concentration data over the one or more image files. The method further includes transmitting the fluid data map to one or more remote computing devices.

DRAWINGS

These and other features, aspects, and advantages of the present disclosure will become better understood when the following detailed description is read with reference to the accompanying drawings in which like characters represent like parts throughout the drawings, wherein.

Figure 1:
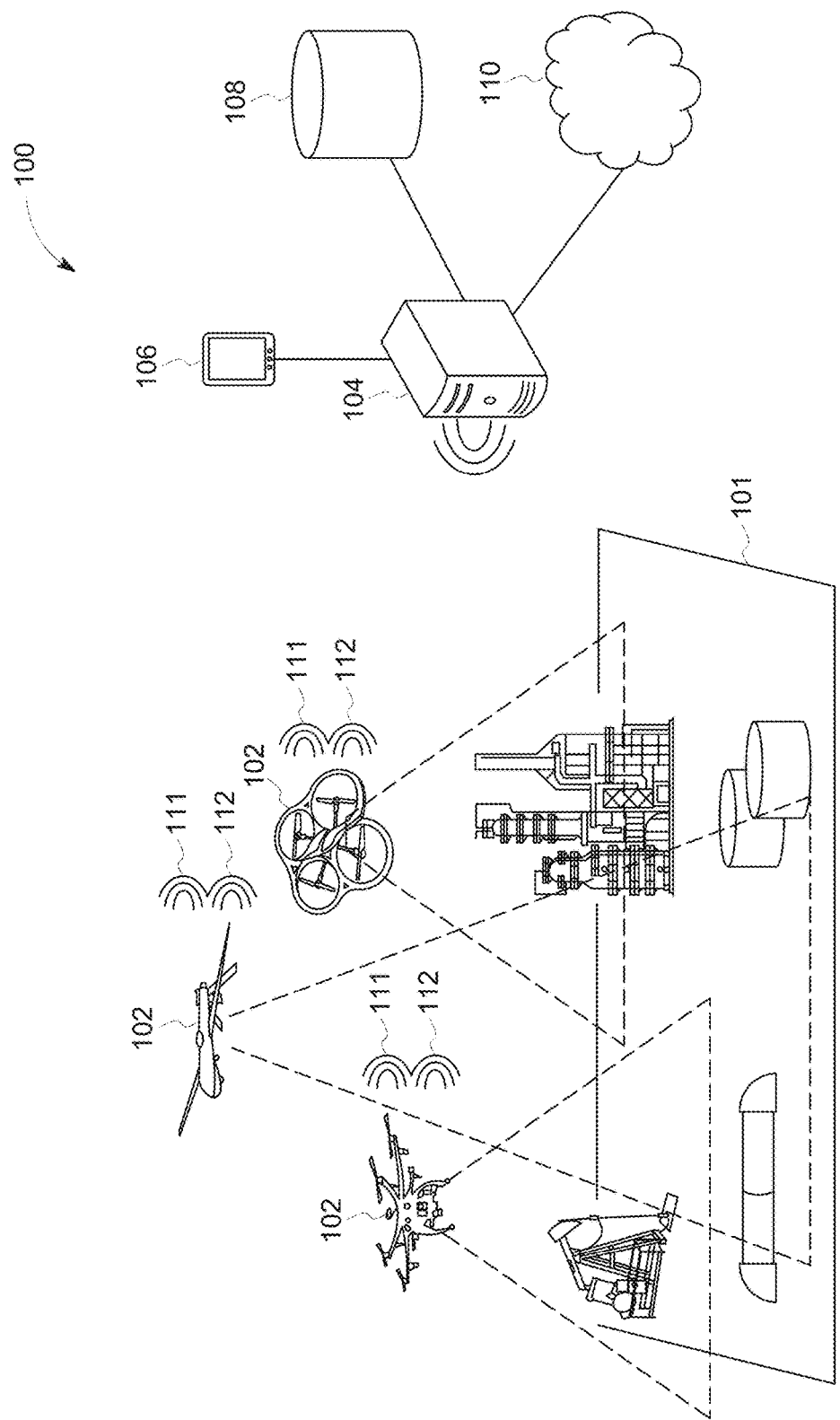
FIG. 1 is a schematic view of an exemplary asset inspection system including a remote processing device.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device", "computing device", "on-board computing device", "remote computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "cloud computing" and related terms, e.g., "cloud computing devices" and "industrial cloud-based platform," refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the term "fluid" is intended to refer to any substance in a liquid, gaseous, or mixed state. Fluids detected and analyzed by asset inspection systems disclosed herein are generally indicative of operational conditions of one or more industrial assets. In oil and gas applications of the disclosed asset inspection system, for example, fluids of interest include, without limitation, methane, water vapor, carbon dioxide, ammonia, hydrogen sulfide, nitrous oxide, non-methane volatile organic compounds, and sulfur dioxide. Nevertheless, the term "fluid" as used herein is not intended to be limited to a specific liquid, gas, or liquid/gas mixture.

The remote processing device and associated methods described herein facilitate improved collection of inspection data for industrial assets and, in particular, oil and gas equipment. More specifically, the remote processing device and methods described herein facilitate improved remote inspection of oil and gas equipment for purposes of locating and quantifying fluid leaks that may require intervention. To do so, the remote processing device functions as an intermediary between one or more inspection apparatuses and other computing devices including, without limitation, a mobile device of an on-site operator, a data storage system, and an industrial cloud-based platform configured to perform advanced analytics based on data provided by the remote processing device.

Remote processing devices described herein improve collection of inspection data by reducing the overall power consumption by the inspection apparatuses. More specifically, remote processing devices described herein are configured to receive data from each of the one or more inspection apparatuses in a relatively unprocessed format and to perform at least a portion of the data processing normally handled by an on-board computing device of the inspection apparatuses. For example, instead of an inspection apparatus processing image data, remote processing devices described herein are configured to receive unprocessed image data from each of the inspection apparatuses and to generate image files from the unprocessed image data. By doing so, the remote processing device reduces the power consumed by the inspection apparatus to process the image data and reduces the overall weight of the inspection apparatus by eliminating the need for specialized data processing hardware, such as a graphics processing unit. The power saved by processing data at the remote processing device enables improved data collection due to longer inspection missions for the inspection apparatus and/or the inclusion of additional or more powerful sensors for use during inspection missions.

Remote processing devices described herein are further configured to combine data collected from the inspection apparatuses and retrieved from external data sources into data visualizations for use by operators in analyzing equipment conditions. More specifically, remote processing devices described herein facilitate the generation of twodimensional and three-dimensional visualizations of a geographic area of interest, referred to herein as "fluid data maps", including overlays of collected sensor data, such as fluid concentration data. The visualizations of the collected data enable operators to more accurately locate potential issues, such as fluid leaks. Data visualizations may incorporate other data including meteorological data, geographic data, and historical data to provide an operator with a more complete understanding of operating conditions.

FIG. 1 is a schematic view of an exemplary asset inspection system 100 for inspecting industrial assets in a geographic region 101. In the exemplary embodiment, asset inspection system 100 is configured to inspect oil and gas equipment geographic region 101. Asset inspection system 100 includes one or more inspection apparatuses 102, which, in the exemplary embodiment, are inspection vehicles 102. Each of inspection vehicles 102 is capable of autonomous, semi-autonomous, and fully piloted navigation. Inspection vehicles 102 include, without limitation, aerial, ground-based, and water-based vehicles. Aerial vehicles include, without limitation, fixed wing aircraft, tilt-rotor aircraft, helicopters, multirotor drone aircrafts such as quadcopters, blimps, dirigibles, or other aircrafts. Ground-based inspection vehicles include, without limitation, wheeled vehicles, crawling or walking vehicles, vehicles with tracks, and air-cushioned vehicles (such as hovercrafts). Water-based vehicles include, without limitation, boats and other surface-based vehicles, submarines, and underwater rovers. Each of inspection vehicles 102 is communicatively coupled to a remote processing device 104, using one or more wireless communications standards. In the exemplary embodiment, remote processing device 104 is further communicatively coupled to mobile computing device 106, remote data source 108, and industrial cloud-based platform 110.

During operation, each of inspection vehicles 102 executes route plans configured to navigate inspection vehicles 102 to points of interest in geographic region 101 and to collect data regarding the points of interest. Each of inspection vehicles 102 further includes geolocation units for identifying their respective position. In the exemplary embodiment, each of inspection vehicles 102 includes at least one imaging sensor unit for capturing unprocessed image data and at least one quantitative fluid sensor unit configured to capture fluid concentration data. Accordingly, during execution of the route plan, inspection vehicles 102 navigate to the points of interest specified by the route plans and capture data using the imaging sensor unit and fluid sensor unit. The captured data is then geotagged with the current location of the capturing inspection vehicle and transmitted to remote processing device 104 for additional processing. The captured data is transmitted over multiple channels from each of inspection vehicles 102 to remote processing device 104. For example, each of inspection vehicles 102 transmit geotagged unprocessed image data to remote processing device 104 over a first communication channel 111 and geotagged fluid concentration data over a second communication channel 112.

Remote processing device 104 receives and processes data from each of inspection apparatuses 102. For example, remote processing device 104 receives geotagged unprocessed image data from inspection vehicles 102 and converts the geotagged unprocessed image data and performs digital image processing on the geotagged unprocessed image data. Digital image processing includes, without limitation, resizing the image, compressing the image, and correcting one or more of color, white balance, brightness, and similar properties of the image. Digital image processing further includes, if necessary, converting the unprocessed image data into a readable and/or displayable file format. Remote processing device 104 also combines the geotagged fluid sensor data with the processed image data to generate a visual representation of the data collected by inspection vehicles 102. In certain embodiments, remote processing device 104 analyzes the geotagged fluid data received from inspection vehicles 102 and determines whether the geotagged fluid data meets predetermined criteria for additional inspection. For example, in certain embodiments, remote processing device 104 determines whether fluid concentration levels indicated by received geotagged fluid concentration data exceeds a predetermined fluid concentration threshold. If so, remote processing device 104 generates a new route plan or modifies an existing route plan to cause one or more of inspection vehicles 102 to reinspect the location associated with the high fluid concentration reading.

Remote processing device 104 is communicatively coupled over one or more networks to other computing devices including mobile computing device 106, remote data source 108, and industrial cloud-based platform 110. Mobile computing device 106 includes, without limitation, a laptop, smartphone, tablet computer, or similar portable device. During operation, an operator uses mobile computing device 106 to view and analyze data provided by inspection vehicles 102 and to issue commands to inspection vehicles 102. More specifically, remote processing device 104 provides mobile computing device 106 with data collected by inspection vehicles in a format displayable on a display (not shown) of mobile computing device 106. The operator then reviews the data collected by inspection vehicles 102 and, if necessary, issues additional commands to inspection vehicles 102 including, without limitation, requests to reinspect a given piece of equipment or point of interest, to inspect a different piece of equipment or point of interest, to end a current route plan, and to begin a different route plan.

Remote data source 108 stores supplemental data accessible by remote processing device 104 for purposes of supplementing the geotagged image and fluid data collected by inspection vehicles 102. Remote data source 108 generally includes one or more storage devices containing one or more databases. Examples of data stored in remote data source 108 include, without limitation, geographic data, meteorological data, previously collected fluid data, and general reference data (e.g., fluid properties and characteristics). By combining the supplemental data with the geotagged fluid and image data captured by inspection vehicles 102, remote processing device 104 generates data visualization with improved sophistication, improved accuracy, and improved utility as compared to data visualizations based only on the geotagged image and fluid data. For example, in one embodiment, remote processing device 104 retrieves supplemental data from remote data source 108 and generates a data visualization including a first layer corresponding to recently collected fluid data and one or more second layers including historical fluid data captured over time, with each layer overlaid on an image of geographic region 101. The data visualization is then transmitted to mobile computing device 106 where a user is able to animate the layers or otherwise turn certain layers of the data visualization on or off to analyze changes in the fluid data over time. Supplemental data from remote data source 108 can also be used to pinpoint the location of fluid leaks. For example, in certain embodiments, remote data source 108 includes weather data, such as wind patterns, that can be used to trace fluid leaks to a point of origin. In yet another example, supplemental data from remote data source 108 includes historical fluid concentration data taken over a period of time and is used to calculate fluid leak rates and total fluid leakage from a given source over the period of time.

Remote processing device 104 is also communicatively coupled to industrial cloud-based platform 110. Industrial cloud-based platform 110 is generally a system of networked computing devices configured to collect and analyze data from the networked computing devices. During operation, remote processing device 104 is configured to provide data collected by inspection vehicles 102 to industrial cloud-based platform 110, which performs various analytics on the provided data. The results of the analytics performed by industrial cloud-based platform 110 are then used to facilitate asset performance management. In certain embodiments, industrial cloud-based platform 110 performs analytics including, without limitation, fluid leak localization, leak rate determination from one or more industrial assets, and total leakage determinations from one or more industrial assets. In certain embodiments, industrial cloud-based platform 110 is communicatively coupled, either directly or indirectly through one or more intermediate computing devices, to one or more pieces of industrial equipment and is able to communicate with and/or control the one or more pieces of industrial equipment in response to the analytics. For example, during one operation, industrial cloud-based platform 110 receives data from remote processing device 104 and, based on an analysis of the received data, determines that a piece of inspected equipment has a fluid leak that exceeds a predetermined leak rate threshold. In response to such a determination, industrial cloud-based platform 110 may take one or more actions including, without limitation, generating and transmitting a report or similar message identifying the leak, issuing a command that modifies one or more control parameters of the equipment, activating or modifying operation of additional equipment associated with the inspected equipment, shutting down the inspected equipment, and issuing an alarm or alert to a control system communicatively coupled to the equipment.

In certain embodiments, at least one of remote processing device 104, and industrial cloud-based platform 110 use fluid concentration data collected by inspection vehicles 102 to analyze leakage from an industrial asset. More specifically, remote processing device 104 and/or industrial cloud-based platform 110 determines leakage based on fluid concentration data collected in a particular location or area over time. Leakage determinations by remote processing device 104 and/or industrial cloud-based platform 110 include determining, without limitation, one or more of a leak location, a leakage rate, a change in leakage rate, and a total leakage over a period of time. Leakage rate and total leakage may be determined based on either mass or volumetric basis. For example, in embodiments in which a leakage rate is calculated, the leakage rate may be expressed in either a volumetric flow rate, such as standard cubic feet per hour, or a mass flow rate, such as pounds per hour.

In certain embodiments, leakage determinations, including, without limitation, determining one or more of a total leakage, leakage rate, or leak location data from the fluid concentration data includes the application of one or more numerical or analytic techniques and methods. For example, in certain embodiments leakage data is derived by correlating fluid concentration data and fluid concentration flux data, such as data corresponding to changes of the fluid concentration data over time and/or location. In certain embodiments, leakage data is determined, at least in part, using one or more modelling techniques including, without limitation, Gaussian dispersion modelling and similar atmospheric modelling techniques. In still other embodiments, determining leakage data includes solving an inverse problem for one or more unknown parameters including, without limitation, one or more of a leakage rate and a leakage location. For example, in one such embodiment, solving the inverse problem includes characterizing the inverse problem as an optimization problem in which error between actual fluid concentration measurements and model predictions are minimized. Optimization techniques include, without limitation, least-squares optimization, greedy optimization, and Bayesian optimization. In certain embodiments, leakage determinations are based, at least on part, from data and/or analytic results obtained from external sources including, without limitation, remote data source 108 and cloud-based platform 110.

Figure 2:
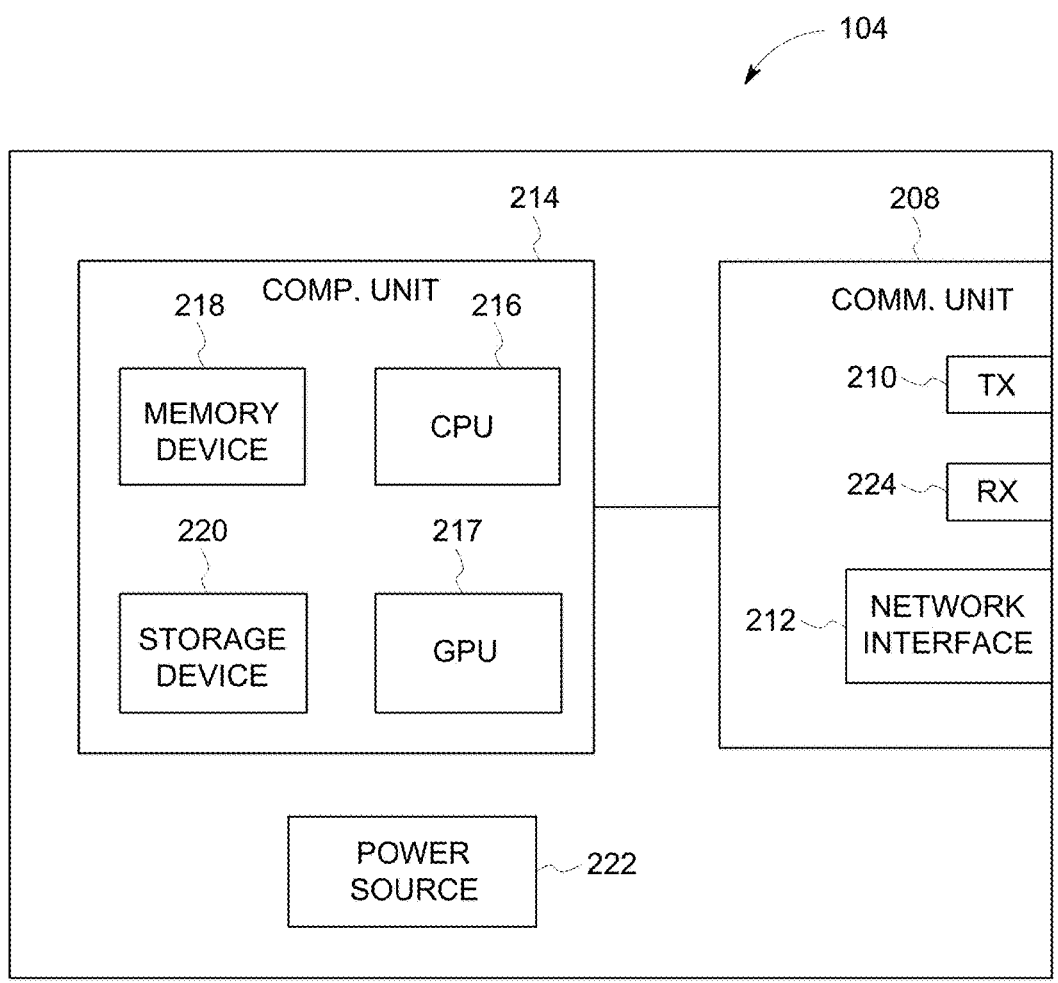
FIG. 2 is an exemplary schematic view of a remote processing device for use in the asset inspection system of FIG. 1.

FIG. 2 is a schematic view of remote processing device 104 of asset inspection system 100 (shown in FIG. 1). Remote processing device 104 includes a communication unit 208, an on-board computing device 214, and a power source 222. Communication unit 208 further includes a transmitter 210, a network interface 212, and a receiver 224. On-board computing device 214 further includes at least one processor 216 and each of a memory device 218, graphics processing unit (GPU) 217, and storage device 220 coupled to processor 216.

Processor 216 includes one or more of a microcontroller, a reduced instruction set circuits (RISC), an application-specific integrated circuits (ASICs), a logic circuit, and/or any other circuit or processor that is capable of executing the functions described herein. Processor 216 includes one or more processing units (not shown), such as, without limitation, an integrated circuit (IC), an application specific integrated circuit (ASIC), a microcomputer, a programmable logic controller (PLC), and/or any other programmable circuit. Processor 216 may include multiple processing units (e.g., in a multi-core configuration). Processor 216 executes instructions which perform the functions described herein. The above examples are exemplary only, and thus are not intended to limit in any way the definition and/or meaning of the term "processor."

Memory device 218 and storage device 220 are configured to store data for use by processor 216. Memory device 218 stores executable instructions executable by processor 216 for performing the functions described herein and generally includes, without limitation, read-only memory (ROM), random access memory (RAM), non-volatile RAM (NVRAM), and any combination thereof. In contrast, storage device 220 is configured to provide permanent storage for data collected by remote processing device 104 or data that is otherwise required by remote processing device 104. Storage device 220 includes, without limitation, one or more of an internal hard drive, a solid state drive, optical media, and a flash drive. In certain embodiments, memory device 218 and storage device 220 are incorporated into the same device.

Graphics processing unit 217 is a specialized processor configured to receive unprocessed image data and to efficiently manipulate the unprocessed image data to generate a one or more image files. During processing of the image data, graphics processing unit 217 performs one or more operations including, without limitation, smoothing, anti-aliasing, color correction, brightness and contrast correction, filtering, resizing, compression, and color or white balancing.

Communication unit 208 facilitates communication to and from remote processing device 104. Communication unit 208 includes a transmitter 210, a network interface 212, and a receiver 224. In the exemplary embodiment, communication unit 208 is configured to communicate using transmitter 210 and receiver 224 using a wireless communication standard such as Bluetooth™ or Z-Wave™, through a wireless local area network (WLAN) implemented pursuant to an IEEE (Institute of Electrical and Electronics Engineers) 802.11 standard (i.e., WiFi), and/or through a mobile phone (i.e., cellular) network (e.g., Global System for Mobile communications (GSM), 3G, 4G) or other mobile data network (e.g., Worldwide Interoperability for Microwave Access (WIMAX)), MAVLink, or a wired connection (i.e., one or more conductors for transmitting electrical signals). In contrast, network interface 212 is configured to provide a direct, wired connection to a network including, without limitation, at least one of a telephone network, a cable network and any combination thereof.

Power source 222 provides power to components of remote processing device 104. Power source 222 is, for example, and without limitation, one or more of a battery, solar cell, connection to a power grid, generator, or other source of electrical energy. In certain embodiments, power source 222 includes at least one device for storing electrical energy such as a battery, capacitor, fuel cell, and/or other device for storing electrical energy. In certain embodiments, such as when remote processing device 104 is located in an area in which a connection to a power grid is unavailable, such stored electrical energy is used as the primary power source for remote processing device 104. In other embodiments, the stored electrical energy serves as a secondary or emergency power source in the event that a primary power source fails. For example, in certain embodiments, power source 222 includes a connection to a power grid as a primary power source and a battery that stores electrical energy as an emergency back up in the event that the connection to the power grid fails. In alternative embodiments, remote processing device 104 is powered by liquid and/or solid fuel. More specifically, remote processing device 104 includes power source 222 that is a fuel tank or storage device and includes a refueling port (e.g., a probe configured to receive fuel from a drogue or other fuel source).

During operation, remote processing device 104 communicates with one or more inspection apparatuses, such as inspection apparatuses 102 (shown in FIG. 1), to facilitate collection and analysis of inspection data. Inspection apparatuses 102 are configured to operate with remote processing device 104 and generally include at least one imaging sensor (not shown) for collecting image data and at least one fluid sensor unit (not shown) for collecting fluid concentration data. Each of inspection apparatuses 102 executes a route plan including route instructions that cause the respective inspection vehicle to navigate to a point of interest specified in the route plan and to capture image data and fluid concentration data using imaging sensor and fluid sensor unit, respectively. Inspection apparatuses 102 geotag each of the captured image data and captured fluid concentration data and transmit the geotagged image data and the geotagged fluid concentration data to remote processing device 104. In the exemplary embodiment of inspection vehicle asset inspection system 100, each of inspection apparatuses 102 includes at least a first transmitter and a second transmitter. The first transmitter is configured to transmit geotagged image data over a first communication channel and the second transmitter configured to transmit the geotagged fluid sensor data over a second communication channel.

In the exemplary embodiment, communication unit 208 includes receiver 224 for receiving geotagged unprocessed image data and geotagged fluid concentration data from inspection apparatuses 102. In the exemplary embodiment, receiver 224 is a multi-channel receiver capable of receiving both the geotagged image data over the first communication channel and the geotagged fluid sensor data over the second communication channel. In other embodiments, communication unit 208 includes multiple receivers, each receiver configured to receive data from inspection apparatuses 102 over a respective channel. After remote processing device 104 receives the geotagged unprocessed image data from inspection apparatuses 102, remote processing device 104 processes the geotagged unprocessed image data using GPU 217 to generate one or more image files.

Remote processing device 104, and more specifically processor 216, combines the one or more image files and the geotagged fluid concentration data into a fluid data map. The fluid data map is then transmitted through communication unit 208 to mobile computing device 106. The term "fluid data map" is used herein to denote a data object that combines the image data and fluid concentration data for purposes of display and analysis. In the exemplary embodiment, the fluid data map is configured to be displayed on a remote computing device, such as mobile computing device 106 (shown in FIG. 1). More specifically, mobile computing device 106 (or a similar remote computing device) includes a display (not shown) and a processor (not shown) configured to present fluid data maps received by mobile computing device 106 from remote processing device 104. For example, mobile computing device 106 includes one or more applications configured to display fluid data maps and to facilitate navigation, manipulation, and analysis of fluid data maps by a user of mobile computing device 106. Fluid data maps may include one or more layers of fluid and image data which may be selectively displayed on mobile computing device 106.

In alternative embodiments, remote processing device 104 is further configured to receive additional data from inspection apparatuses 102 and to incorporate the additional data into fluid data maps. For example, in one embodiment, inspection apparatuses 102 are equipped with qualitative fluid sensor units configured to capture qualitative fluid data. Inspection apparatuses 102 geotag the qualitative fluid data and transmit the geotagged qualitative fluid data to remote processing device 104, which incorporates the geotagged qualitative fluid data into a fluid data map using processor 216. The term "qualitative fluid data" is used herein to denote fluid data related to the presence of a fluid. For example, in one embodiment, qualitative fluid sensor units of inspection apparatuses 102 are imaging devices configured to capture images depicting the size and shape of a fluid plume emanating from a piece of equipment. Such data is particularly useful to characterize plumes of fluids that are otherwise invisible to the naked eye and/or imaging devices configured to capture light in the visible spectrum. Qualitative fluid sensor units include infrared (IR) sensor units configured to capture IR image data. IR image data differentiates between the IR characteristics of a fluid plume and the surrounding ambient air, thereby facilitating identification of the overall size and shape of the fluid plume even when the fluid plume is otherwise invisible to the naked eye or conventional imaging sensors. In other embodiments, qualitative fluid sensor units include at least one of a mid- and near-infrared sensor.

In a second embodiment, inspection apparatuses 102 are equipped with three-dimensional scanning units configured to capture three-dimensional point data. The three-dimensional scanning units, which in the exemplary embodiment are light distancing and ranging (LIDAR) units, generally include at least one laser unit configured to emit a laser, one or more detection units configured to detect reflections of the laser, and internal circuitry configured to calculate a time-of-travel of the laser and a corresponding distance to the object off of which the laser is reflected. Such distance measurements can then be used to construct a point cloud corresponding to the area scanned by the three-dimensional scanning unit. Accordingly, in certain embodiments, inspection apparatuses 102 capture three-dimensional point data using three-dimensional scanning units, geotag the three-dimensional point data, and transmit the geotagged three-dimensional point data to remote processing device 104, which incorporates the geotagged three-dimensional point data into a fluid data map using processor 216. In such embodiments, the fluid data map includes a three-dimensional map in which the geotagged fluid concentration data and one or more image files are overlaid on a three-dimensional model constructed from the three-dimensional point data.

In certain embodiments, remote processing device 104 is further configured to receive supplemental data from external data sources, such as remote data source 108 and industrial cloud-based platform 110 (shown in FIG. 1). Supplemental data includes, without limitation, one or more of meteorological data, geographic data, historical fluid data, historical image data, and reference information, such as fluid properties. Accordingly, remote processing device 104, and more specifically processor 216, is configured to generate one or more requests for supplemental data and to transmit the requests to remote data source 108 and/or industrial cloud-based platform 110. In response, remote data source 108 and industrial cloud-based platform 110 execute the request and transmit the corresponding supplemental data to remote processing device 104. On receipt of the supplemental data, processor 216 utilizes the supplemental data including, without limitation, incorporating the supplemental data into a fluid data map and constructing a fluid data map based, at least in part, on the supplemental data.

In certain embodiments, remote processing device 104 is configured to analyze the geotagged fluid concentration data received from inspection apparatuses 102 (shown in FIG. 1). More specifically, processor 216 is configured to analyze geotagged fluid concentration data from inspection apparatuses 102 and to determine whether a portion of the geotagged fluid concentration data indicates a fluid concentration measurement that exceeds a predetermined concentration threshold. In certain embodiments, processor 216 is configured to determine whether a portion of the geotagged fluid concentration data indicates one or more of a total leakage or leakage rate that exceeds a predetermined leakage threshold. In response to such a determination, processor 216 generates a route plan configured to cause one or more of inspection apparatuses 102 to navigate to a geographic location corresponding to the portion of the geotagged data, to capture additional fluid concentration data at the geographic location, to geotag the additional fluid concentration data, and to transmit the geotagged additional fluid concentration data to remote processing device 104. In certain embodiments, the route instructions are further configured to cause one or more of inspection apparatuses 102 to capture additional data at the geographic location, including, without limitation, additional image data. Remote processing device 104 then transmits the route plan to one or more of inspection apparatuses 102 to facilitate execution of the route plan by the one or more of inspection apparatuses 102.

In the exemplary embodiment of asset inspection system 100 (shown in FIG. 1), remote processing device 104 is communicatively coupled through communication unit 208 to a mobile computing device 106 (shown in FIG. 1). Mobile computing device 106 includes, without limitation a laptop, smartphone, tablet computer, and similar portable computing devices. During operation, remote processing device 104 provides the fluid data map to mobile computing device 106 for display by computing device 106 to an operator. Accordingly, the operator can review the fluid data map and identify any potential operational issues. In certain embodiments, mobile computing device 106 permits an operator to select one or more points of interest from the fluid data map and transmits the points of interest to remote processing device 104. In response to receiving a point of interest from mobile computing device 106, processor 216 generates a route plan configured to cause one or more of inspection apparatuses 102 to navigate to the point of interest, to capture additional fluid concentration data at the geographic location, to geotag the additional fluid concentration data, and to transmit the geotagged additional fluid concentration data to remote processing device 104. In certain embodiments, remote processing device 104 and mobile computing device 106 exchange confirmation messages before the route plan is generated and transmitted to one or more of inspection apparatuses 102. More specifically, upon receipt of a point of interest from mobile computing device 106, remote processing device 104 generates a confirmation message and transmits the confirmation message to mobile computing device such that mobile computing device 106 prompts a user to confirm the new route plan. Upon receipt of confirmation, processor 216 proceeds to generate the route plan and transmit the route plan to one or more of inspection apparatuses 102.

In the exemplary embodiment of asset inspection system 100 (shown in FIG. 1), remote processing device 104 is further communicatively coupled through communication unit 208 to an industrial cloud-based platform 110 (shown in FIG. 1). During operation, remote processing device 104 is configured to receive instructions from industrial cloud-based platform 110. Industrial cloud-based platform 110 is generally a system of networked computing devices configured to collect and analyze data from and to communicate instructions to the networked computing devices. Accordingly, in certain embodiments, remote processing device 104 is configured to receive instructions from industrial cloud-based platform 110 including one or more points of interest for which industrial cloud-based platform 110 requires additional data. In response to receiving a point of interest from industrial cloud-based platform 110, processor 216 generates a route plan configured to cause one or more of inspection apparatuses 102 to navigate to the point of interest, to capture additional fluid concentration data at the geographic location, to geotag the additional fluid concentration data, and to transmit the geotagged additional fluid concentration data to remote processing device 104.

In the exemplary embodiment of asset inspection system 100, remote processing device 104 is further configured to transmit data for storage in an external data source, such as remote data source 108. Data transmitted to remote data source 108 includes, without limitation, data as received from inspection apparatuses 102 (such as geotagged unprocessed image data and geotagged fluid concentration data) and data generated or otherwise processed by remote processing device 104, including one or more image files derived from the geotagged unprocessed image data and fluid data maps. Accordingly, data acquired by remote processing device 104 from inspection apparatuses 102 is added to the supplemental data available from remote data source 108 for later generation of fluid data maps.

In certain embodiments, inspection apparatuses 102 include one or more video camera devices. Accordingly, in such embodiments, remote processing device 104 is configured to receive a video feed from one or more of inspection vehicles through communication unit 208 and to process the video feed using graphics processing unit 217. The processed video feed is then at least one of recorded (such as by generating a video file and saving the video file to one of remote data source 108 and storage device 220) and streamed to one or more of mobile computing device 106 and industrial cloud-based platform 110.

Figure 3:
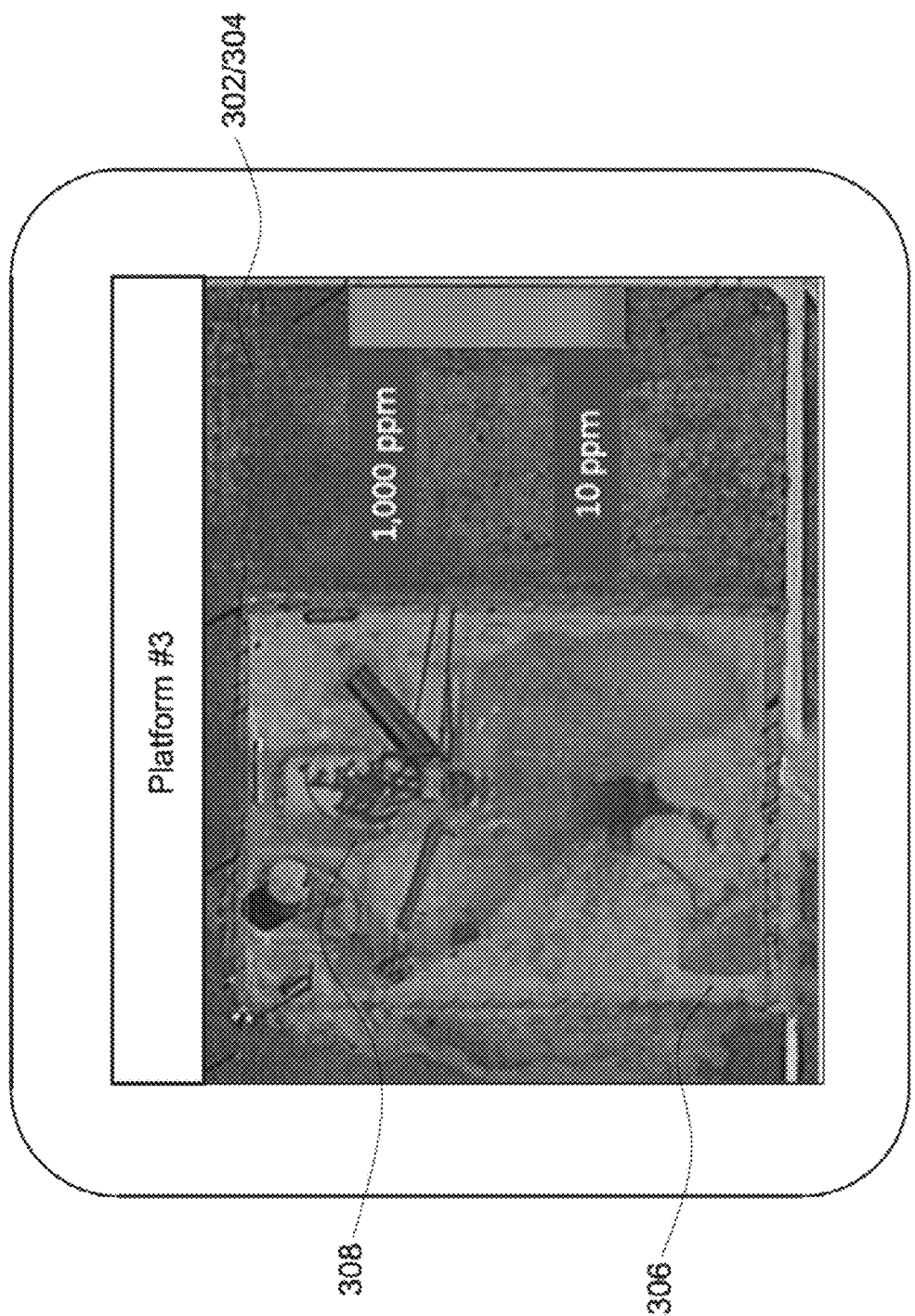
FIG. 3 is a schematic view of a mobile computing device for use in the asset inspection system of FIG. 1 displaying a fluid data map as generated by the remote processing device of FIG. 2.

FIG. 3 is a schematic view a mobile computing device, such as mobile computing device 106, displaying a fluid data map generated by a remote processing device, such as remote processing device 104. Mobile computing device 106 generally includes a processor (not shown) coupled to a memory device (not shown), a communication unit (not shown), a display 302, and one or more input devices, such as touchscreen 304. During operation, the processor executes one or more applications stored in the memory device configured to receive fluid data maps from remote processing device 104 and to display the fluid data maps using display 302.

In the embodiment depicted in FIG. 3, display 302 depicts a fluid data map 306. As previously discussed in the context of FIG. 2, fluid data maps generated by remote processing device 104 generally include one or more image files derived from geotagged unprocessed image data overlaid with geotagged fluid concentration data. In certain embodiments, the fluid data maps further include one or more of geotagged qualitative fluid data and geotagged three-dimensional point data. In fluid data map 306, for example, a heat map 308 provides a visualization of both geotagged fluid concentration data and geotagged qualitative fluid data. More specifically, the overall size and shape of heat map 308 is derived from geotagged fluid concentration data while the varying shades of heat map 308 correspond to the geotagged quantitative fluid data, and, more specifically, the fluid concentration in parts per million represented by the geotagged fluid concentration data.

Figure 4:
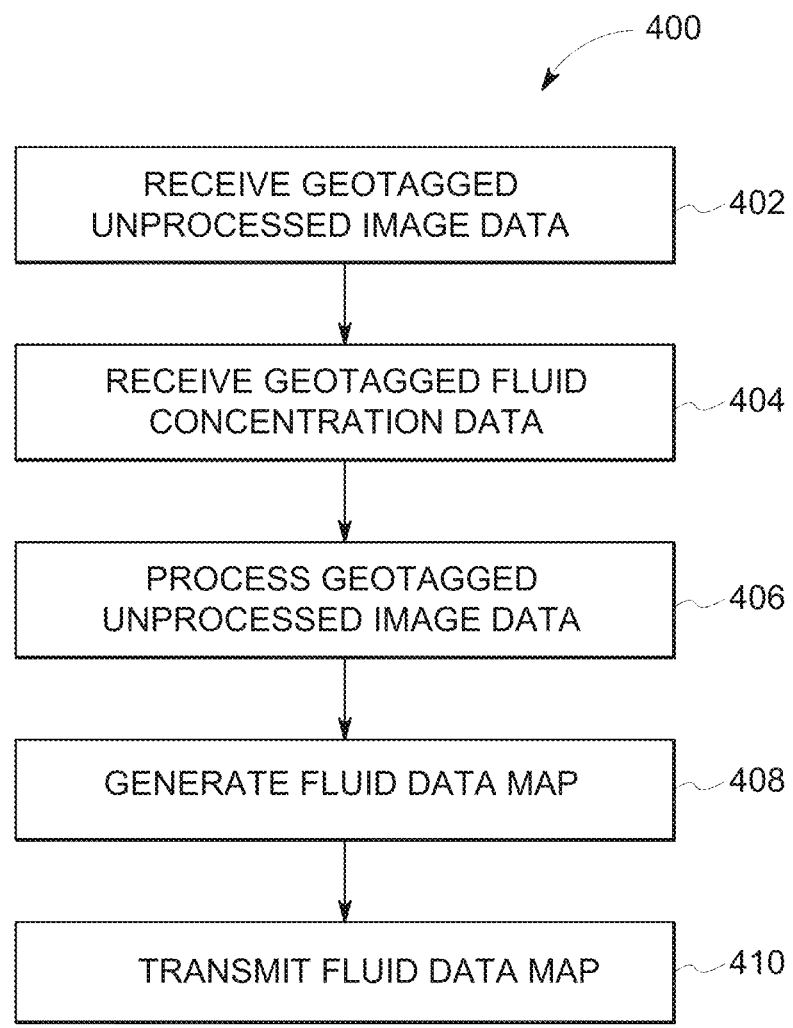
FIG. 4 is a flow chart of an exemplary method of processing inspection data using the remote processing device of FIG. 2.

FIG. 4 is a flow chart of an exemplary method 400 of processing inspection data executable by a remote processing device 104 (shown in FIGS. 1 and 2) of an asset inspection system 100 (shown in FIG. 1). Method 400 includes, at step 402, receiving geotagged unprocessed image data from one or more inspection apparatuses 102 (shown in FIG. 1) at remote processing device 104. More specifically, geotagged fluid concentration data is transmitted by one or more inspection apparatuses 102 over a first communication channel 111 (shown in FIG. 1). At step 404, remote processing device 104 receives geotagged fluid concentration data, from one or more of inspection apparatuses 102 over a second communication channel 112 (shown in FIG. 1).

At step 406 and upon receipt of the geotagged unprocessed image data, remote processing device 104 processes the geotagged unprocessed image data into one or more image files. In certain embodiments, processing the geotagged unprocessed image data includes processing the geotagged unprocessed image data using a graphics processing unit, such as graphics processing unit 217 (shown in FIG. 2). Processing of the geotagged unprocessed image data includes one or more digital processing operations including, without limitation, one or more of smoothing, anti-aliasing, color correction, brightness and contrast correction, filtering, resizing, compression, and color or white balancing.

At step 408, remote processing device 104 generates a fluid data map by overlaying the geotagged fluid concentration data over the one or more image files. In certain embodiments, the geotagged fluid concentration data is combined with the one or more image files based on the geolocation information contained in their associated geotags.

In certain embodiments, generating the fluid data map further includes combining additional data with the fluid concentration data and image files. For example, in certain embodiments, additional data includes, without limitation, three-dimensional point data obtained from inspection apparatuses 102, leakage data calculated by one or more of remote processing device and cloud-based platform 110 (shown in FIG. 1), and one or more of meteorological data, geographic data, and historical data stored in a remote data source, such as remote data source 108 (shown in FIG. 1). In certain embodiments, for example, fluid data map is a three-dimensional data map generated, at least in part, from three-dimensional point data collected using a three-dimensional scanning unit (such as a LIDAR unit) of one or more of inspection apparatuses 102.

At step 410, remote processing device 104 transmits the fluid data map to one or more remote computing device. In the exemplary embodiment, the one or more remote computing devices is a mobile computing device, such as mobile computing device 106 (shown in FIGS. 1 and 3), configured to display the fluid data map to a user of mobile computing device 106 to facilitate analysis of the underlying data of the fluid data map.

The above-described apparatus and method provide for a remote processing device for enhanced inspection of industrial assets using inspection vehicles. Remote processing devices and methods described herein facilitate enhanced inspection of an industrial asset by the inspection vehicles by performing at least a portion of data processing on behalf of the inspection vehicles. Accordingly, the inspection vehicles perform limited on-board processing, facilitating removal of unnecessary data processing systems on-board the inspection vehicles or replacement of such data processing systems with additional sensors. Limited on-board processing and reduced weight further reduces the amount of power consumed by data processing, thereby allowing for longer inspection missions and a greater quantity of sensor data collected on a given inspection mission. Remote processing devices and methods described herein further provide for enhanced inspection of industrial assets using inspection vehicles by efficiently collecting and disseminating data collected by the inspection vehicles and facilitating analysis of the collected data.

An exemplary technical effect of the apparatus and methods herein includes at least one of: (a) improving data collection by facilitating replacement of data processing equipment on board inspection vehicles with additional sensor units; (b) improving inspection time of inspection vehicles by reducing weight of the inspection vehicles; (c) improving inspection time by reducing power consumption required for on-board data processing by the inspection vehicles; (d) facilitating efficient and rapid modification of inspection vehicle route plans by readily presenting collected data to mobile computing devices and industrial cloud-based platforms; and (e) facilitating enhanced analysis of data collected by inspection vehicles by combining the collected data with supplemental data stored in remote data sources.

Exemplary embodiments of methods of processing inspection data executable by a remote processing device of an asset inspection system and corresponding remote processing devices are described above in detail. The method and systems described herein are not limited to the specific embodiments described herein, but rather, components of systems or steps of the methods may be utilized independently and separately from other components or steps described herein. For example, the apparatus and methods disclosed herein may be implemented in applications outside of the oil and gas industry for purposes of monitoring operating conditions of other pieces of industrial equipment. Additionally, the methods may also be used with other components of devices, and are not limited to practice with only the components as described herein. Rather, the exemplary embodiments may be implemented and utilized in connection with many other unmanned vehicles and asset inspection systems.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A remote processing device for processing inspection data collected by one or more inspection apparatuses, said remote processing device configured to be remotely located from the one or more inspection apparatuses during collection of the inspection data, said remote processing device comprising:
   a communication unit configured to transmit data to the one or more inspection apparatuses and to receive data from the one or more inspection apparatuses; and
   an on-board computing device coupled to said communication unit, said on-board computing device comprising at least one processor and a memory device coupled to said at least one processor, said at least one processor configured to:
      receive, from the one or more inspection apparatuses, geotagged unprocessed image data over a first communication channel;
      receive, from the one or more inspection apparatuses, geotagged fluid concentration data over a second communication channel;
      process the geotagged unprocessed image data into one or more image files;
      retrieve historical fluid concentration data from a remote data source;
      generate a fluid data map, including a plurality of layers displayed within a data visualization of a geographic region associated with the inspection data collected by the one or more inspection apparatuses, the fluid data map displaying the geotagged fluid concentration data in a first layer and the historical fluid concentration data in a second layer overlaid on the first layer, the first and second layers overlaid on a third layer including the one or more image files; and
      transmit the fluid data map to one or more remote computing devices.

2. The remote processing device in accordance with claim 1, wherein said at least one processor is further configured to receive, from the one or more inspection apparatuses, geotagged infrared image data over the second communication channel, and generate the fluid data map by overlaying the geotagged infrared image data in a fourth layer over the third layer including the one or more image files.

3. The remote processing device in accordance with claim 1, wherein said at least one processor is further configured to:
   determine that at least one of a portion of the received geotagged fluid concentration data exceeds a predetermined fluid concentration threshold and a leakage corresponding to the portion of the received geotagged fluid concentration data exceeds a predetermined leakage threshold;
   generate a route plan including one or more route instructions executable by an inspection apparatus of the one or more inspection apparatuses, the route instructions configured to, when executed by the inspection apparatus of the one or more inspection apparatuses:
      navigate the inspection apparatus to a location corresponding to the portion of the geotagged fluid concentration data;
      capture, using the inspection apparatus, at least one of additional geotagged fluid concentration data and additional geotagged unprocessed image data; and
      transmit, from the inspection apparatus, the at least one of the additional geotagged fluid concentration data and the additional geotagged unprocessed image data to said remote processing device; and
   transmit the route plan to the inspection apparatus to facilitate execution of the route plan by the inspection apparatus.

4. The remote processing device in accordance with claim 1, wherein said at least one processor is further configured to:
  transmit the fluid data map to a mobile computing device;
  receive at least one point of interest from the mobile computing device;
  generate a route plan including one or more route instructions executable by an inspection apparatus of the one or more inspection apparatuses, the route instructions configured to, when executed by the inspection apparatus of the one or more inspection apparatuses:
    navigate the inspection apparatus to the at least one point of interest;
    capture, using the inspection apparatus, at least one of additional geotagged fluid concentration data and additional geotagged unprocessed image data; and
    transmit the at least one of the additional geotagged fluid concentration data and the additional geotagged unprocessed image data to said remote processing device; and
  transmit the route instructions to the inspection apparatus to facilitate execution of the route plan by the inspection apparatus.

5. The remote processing device in accordance with claim 4, wherein said at least one processor is further configured to:
  transmit a confirmation request to the mobile computing device; and
  receive, from the mobile computing device, a confirmation message in response to the confirmation request, wherein said at least one processor is configured to generate the route plan in response to receiving the confirmation from the mobile computing device.

6. The remote processing device in accordance with claim 1, wherein said instructions further cause said at least one processor to:
  transmit at least one of the geotagged fluid concentration data, the geotagged unprocessed image data, the one or more image files, and the fluid data map to an industrial cloud-based platform;
  receive, from the industrial cloud-based platform, at least one point of interest from the mobile computing device;
  generate a route plan including one or more route instructions executable by an inspection apparatus of the one or more inspection apparatuses, the route instructions configured to, when executed by the inspection apparatus of the one or more inspection apparatuses:
  navigate the inspection apparatus to the at least one point of interest;
  capture, using the inspection apparatus, at least one of additional geotagged fluid concentration data and additional geotagged unprocessed image data; and
  transmit, from the inspection apparatus, the at least one of the additional geotagged fluid concentration data and the additional geotagged unprocessed image data to said remote processing device; and
  transmit the route instructions to the inspection apparatus to facilitate execution of the route plan by the inspection apparatus.

7. The remote processing device in accordance with claim 1, wherein said at least one processor is further configured to retrieve supplemental data from a remote data source, wherein generating the fluid data map further includes overlaying the supplemental data in a new layer over the third layer including the one or more image files.

8. The remote processing device in accordance with claim 7, wherein the supplemental data includes one or more of meteorological data, geographic data, and historical image data.

9. The remote processing device in accordance with claim 1, wherein said at least one processor is further configured to:
  receive, from the one or more inspection apparatuses, geotagged three-dimensional point data;
  generate a three-dimensional model corresponding to the geotagged three-dimensional point data; and
  generate the fluid data map by overlaying each of the geotagged fluid concentration data and the one or more image files over the three-dimensional model.

10. The remote processing device in accordance with claim 1, wherein said at least one processor is further configured to:
  receive a video feed from an inspection apparatus of the one or more inspection apparatuses; and
  forward the video feed to one or more mobile computing devices.

11. The remote processing device in accordance with claim 1, wherein said at least one processor is further configured to determine at least one of a leakage location, a leakage rate, and a total leakage based, at least in part, on the geotagged fluid concentration data.

12. The remote processing device of claim 1, wherein the at least one processor of the on-board computing device is further configured to receive a user input associated with selecting one or more of the plurality of layers for display, the user input causing the fluid data map to display the selected one or more layers in the data visualization as a time-based animation.

13. One or more non-transitory computer-readable storage media having computer-executable instructions embodied thereon for use in processing inspection data, the instructions executable by a processor of a remote processing device for processing inspection data collected by one or more inspection apparatuses, the remote processing device configured to be remotely located from the one or more inspection apparatuses during collection of the inspection data, wherein when executed by the processor, the computer-executable instructions cause the processor to:
  receive, from one or more inspection apparatuses, geotagged unprocessed image data over a first communication channel;
  receive, from the one or more remote inspection apparatuses, geotagged fluid concentration data over a second communication channel;
  process the geotagged unprocessed image data into one or more image files;
  retrieve historical fluid concentration data from a remote data source;
  generate a fluid data map, including a plurality of layers displayed within a data visualization of a geographic region associated with the inspection data collected by the one or more inspection apparatuses, the fluid data map displaying the geotagged fluid concentration data in a first layer and the historical fluid concentration data in a second layer overlaid on the first layer, the first and second layers overlaid on a third layer including the one or more image files; and
  transmit the fluid data map to one or more remote computing devices.

14. The one or more non-transitory computer-readable storage media in accordance with claim 13, wherein the computer-executable instructions further cause the processor to receive, from the one or more remote inspection apparatuses, geotagged infrared image data over the second communication channel, and generate the fluid data map by overlaying the geotagged infrared image data in a fourth layer over the third layer including the one or more image files.

15. The one or more non-transitory computer-readable storage media in accordance with claim 13, wherein the computer-executable instructions further cause the processor to:
   determine that at least one of a portion of the received geotagged fluid concentration data exceeds a predetermined fluid concentration threshold and a leakage corresponding to the portion of the received geotagged fluid concentration data exceeds a predetermined leakage threshold;
   generate a route plan including one or more route instructions executable by an inspection apparatus of the one or more remote inspection apparatuses, the route instructions configured to, when executed by the inspection apparatus of the one or more remote inspection apparatuses:
   navigate the inspection apparatus to the at least one point of interest;
   capture, using the inspection apparatus, at least one of additional geotagged fluid concentration data and additional geotagged unprocessed image data; and
   transmit the at least one of the additional geotagged fluid concentration data and the additional geotagged unprocessed image data to a remote processing device; and
   transmit the route instructions to the inspection apparatus to facilitate execution of the route plan by the inspection apparatus.

16. The one or more non-transitory computer-readable storage media in accordance with claim 13, wherein the computer-executable instructions further cause the processor to:
   transmit the fluid data map to a mobile computing device;
   receive at least one point of interest from the mobile computing device;
   generate a route plan including one or more route instructions executable by an inspection apparatus of the one or more inspection apparatuses, the route instructions configured to, when executed by the inspection apparatus of the one or more inspection apparatuses:
   navigate the inspection apparatus to the at least one point of interest;
   capture, using the inspection apparatus, at least one of additional geotagged fluid concentration data and additional geotagged unprocessed image data; and
   transmit the at least one of the additional geotagged fluid concentration data and the additional geotagged unprocessed image data to said remote processing device; and
   transmit the route instructions to the inspection apparatus to facilitate execution of the route plan by the inspection apparatus.

17. The one or more non-transitory computer-readable storage media in accordance with claim 13, wherein the computer-executable instructions further cause the processor to:
   transmit at least one of the geotagged fluid concentration data, the geotagged unprocessed image data, the one or more image files, and the fluid data map to an industrial cloud-based platform;
   receive, from the industrial cloud-based platform, at least one point of interest from the mobile computing device;
   generate a route plan including one or more route instructions executable by an inspection apparatus of the one or more inspection apparatuses, the route instructions configured to, when executed by the inspection apparatus of the one or more inspection apparatuses:
   navigate the inspection apparatus to the at least one point of interest;
   capture, using the inspection apparatus, at least one of additional geotagged fluid concentration data and additional geotagged unprocessed image data; and
   transmit the at least one of the additional geotagged fluid concentration data and the additional geotagged unprocessed image data to said remote processing device; and
   transmit the route instructions to the inspection apparatus to facilitate execution of the route plan by the inspection apparatus.

18. The one or more non-transitory computer-readable storage media in accordance with claim 13, wherein the computer-executable instructions further cause the processor to:
   receive supplemental data from a remote data source, wherein the supplemental data includes one or more of meteorological data, geographic data, and historical image data; and
   generate the fluid data map by overlaying the supplemental data in a new layer over the third layer including the one or more image files.

19. The one or more non-transitory computer-readable storage media in accordance with claim 13, wherein the computer-executable instructions further cause the processor to:
   receive, from the one or more inspection apparatuses, geotagged three-dimensional point data; and
   generate a three-dimensional model corresponding to the geotagged three-dimensional point data; and
   generate the fluid data map by overlaying each of the geotagged fluid concentration data and the one or more image files over the three-dimensional model.

20. The one or more non-transitory computer-readable storage media in accordance with claim 13, wherein the computer-executable instructions further cause the processor to determine at least one of a leakage location, a leakage rate, and a total leakage based, at least in part, on the geotagged fluid concentration data.

21. The non-transitory computer-readable media of claim 13, wherein the computer-executable instructions further cause the processor to receive a user input associated with selecting one or more of the plurality of layers for display, the user input causing the fluid data map to display the selected one or more layers in the data visualization as a time-based animation.

22. A method of consolidating and visualizing inspection data collected by one or more inspection apparatuses, said method executable by a remote processing device, the remote processing device configured to be remotely located from the one or more inspection apparatuses during collection of the inspection data, and the remote processing device including an on-board computing device including at least one processor coupled to a memory device, said method comprising:
   receiving, from the one or more inspection apparatuses, geotagged unprocessed image data over a first communication channel;

receiving, from the one or more inspection apparatuses, geotagged fluid concentration data over a second communication channel;

processing, using the on-board computing device, the geotagged unprocessed image data into one or more image files;

retrieving historical fluid concentration data from a remote data source;

generating, using the on-board computing device, a fluid data map, including a plurality of layers displayed within a data visualization of a geographic region associated with the inspection data collected by the one or more inspection apparatuses, the fluid data map displaying the geotagged fluid concentration data in a first layer and the historical fluid concentration data in a second layer overlaid on the first layer, the first and second layers overlaid on a third layer including the one or more image files; and transmitting the fluid data map to one or more remote computing devices.

23. The method in accordance with claim 22 further comprising:

determining, using the on-board computing device, that at least one of a portion of the received geotagged fluid concentration data exceeds a predetermined fluid concentration threshold and a leakage corresponding to the portion of the received geotagged fluid concentration data exceeds a predetermined leakage threshold;

generating, using the on-board computing device, a route plan including one or more route instructions executable by an inspection apparatus of the one or more inspection apparatuses, the route instructions configured to, when executed by the inspection apparatus of the one or more inspection apparatuses:

navigate the inspection apparatus to the at least one point of interest;

capture, using the inspection apparatus, at least one of additional fluid concentration data and additional unprocessed image data; and transmit the at least one of the additional fluid concentration data and the additional unprocessed image data to a remote processing device; and transmitting the route instructions to the inspection apparatus to facilitate execution of the route plan by the inspection apparatus.

24. The method in accordance with claim 22 further comprising receiving, from each of the one or more inspection apparatuses, geotagged infrared image data over the second communication channel, wherein generating the fluid data map further comprises overlaying the geotagged infrared image data in a fourth layer over the third layer including the one or more image files.

25. The method in accordance with claim 22 further comprising:

transmitting the fluid data map to a mobile computing device;

receiving at least one point of interest from the mobile computing device;

generating, using the on-board computing device, a route plan including one or more route instructions executable by an inspection apparatus of the one or more inspection apparatuses, the route instructions configured to, when executed by the inspection apparatus of the one or more inspection apparatuses:

navigate the inspection apparatus to the at least one point of interest;

capture, using the inspection apparatus, at least one of additional fluid concentration data and additional unprocessed image data; and transmit the at least one of the additional fluid concentration data and the additional unprocessed image data to a remote processing device; and transmitting the route instructions to the inspection apparatus to facilitate execution of the route plan by the inspection apparatus.

26. The method in accordance with claim 22 further comprising:

transmitting at least one of the fluid concentration data, the unprocessed image data, the one or more image files, and the fluid data map to an industrial cloud-based platform;

receiving, from the industrial cloud-based platform, at least one point of interest from the mobile computing device;

generating, using the on-board computing device, a route plan including one or more route instructions executable by an inspection apparatus of the one or more inspection apparatuses, the route instructions configured to, when executed by the inspection apparatus of the one or more inspection apparatuses:

navigate the inspection apparatus to the at least one point of interest;

capture, using the inspection apparatus, at least one of additional fluid concentration data and additional unprocessed image data; and transmit the at least one of the additional fluid concentration data and the additional unprocessed image data to a remote processing device; and transmitting the route instructions to the inspection apparatus to facilitate execution of the route plan by the inspection apparatus.

27. The method in accordance with claim 22 further comprising receiving supplemental data from a remote data source, wherein the supplemental data includes one or more of meteorological data, geographic data, and historical image data, and wherein generating the fluid data map further includes overlaying the supplemental data in a new layer over the third layer including the one or more image files.

28. The method in accordance with claim 22 further comprising:

receiving, from the one or more inspection apparatuses, geotagged three-dimensional point data and generating, using the on-board computing device, a three-dimensional model corresponding to the geotagged three-dimensional point data, wherein the fluid data map is a three-dimensional fluid data map and generating the fluid data map further includes overlaying each of the geotagged fluid concentration data and the one or more image files over the three-dimensional model.

29. The method of claim 22, wherein the one or more remote computing devices are further configured to receive a user input associated with selecting one or more of the plurality of layers for display, the user input causing the fluid data map to display the selected one or more layers in the data visualization as a time-based animation.

* * * * *